United States Patent
Gail et al.

(10) Patent No.: US 10,317,575 B2
(45) Date of Patent: Jun. 11, 2019

(54) METHOD AND APPARATUS FOR FORECASTING WEATHER

(71) Applicant: Global Weather Corporation, Boulder, CO (US)

(72) Inventors: William B Gail, Boulder, CO (US); William Myers, Boulder, CO (US); Danny Cheresnick, Longmont, CO (US); Joshua Thompson, Broomfield, CO (US)

(73) Assignee: Global Weather Corporation, Boulder, CO (US)

( * ) Notice: Subject to any disclaimer, the term of this patent is extended or adjusted under 35 U.S.C. 154(b) by 286 days.

(21) Appl. No.: 15/146,416

(22) Filed: May 4, 2016

(65) Prior Publication Data
US 2017/0322342 A1    Nov. 9, 2017

(51) Int. Cl.
*G01W 1/00* (2006.01)
*G01W 1/10* (2006.01)

(52) U.S. Cl.
CPC .................... *G01W 1/10* (2013.01)

(58) Field of Classification Search
CPC ............ G01W 1/10; G01W 1/06; G06F 19/00
USPC ........................................................... 702/3
See application file for complete search history.

(56) References Cited

U.S. PATENT DOCUMENTS

| 7,123,292 | B1 | 10/2006 | Seeger et al. | |
|---|---|---|---|---|
| 2009/0088980 | A1* | 4/2009 | Dai ........................ | G01W 1/00 702/3 |
| 2012/0084005 | A1* | 4/2012 | Fujisaki .................. | G01W 1/10 702/3 |
| 2013/0085673 | A1* | 4/2013 | Cavalcante ............. | G01W 1/10 702/3 |
| 2013/0285820 | A1* | 10/2013 | Assuncao ............... | G01W 1/10 340/601 |

FOREIGN PATENT DOCUMENTS

EP    0924653 A2    6/1999

OTHER PUBLICATIONS

Frank Thomas Tveter, Optimal Pseudo-Observations for Variational Data Assimilation, Norwegian Meteorological Institute, Oslo, Norway, Apr. 17, 2009.

(Continued)

*Primary Examiner* — Caleb E Henry
(74) *Attorney, Agent, or Firm* — The Ollila Law Group LLC

(57) ABSTRACT

The present application describes a means for utilizing mobile sensors to obtain estimated weather observations for use in enhancing climatological databases. Such mobile sensor data is incorporated into a database also containing data from fixed reference sensors. The mobile sensor weather data is combined statistically to derive pseudo-observations to be added to the database. The data from sensors and from prior pseudo-observations are used to perform quality analysis of the data in the database and invalidate outlier data values. The remaining data is used to generate a climatology database that enables generation of more accurate weather forecasts.

16 Claims, 1 Drawing Sheet

(56) References Cited

OTHER PUBLICATIONS

Christopher Daly, Michael Halbleib, Joseph I. Smith, Wayne P. Gibson, Matthew K. Doggett, George H. Taylor, Jan Curtis and Phillip P. Pasteris, Physiographically sensitive mapping of climatological temperature and precipitation across the conterminous United States, International Journal of climatology, Published online in Wiley InterScience, United States.

Per Kragh Andersen, Mette Gerster Hansen, John P. Klein, Regression analysis of Restricted Mean Survival Time Based on Pseudo-Observations, Lifetime Data Analysis 10,335-350 2004, 2005 Kluwer Academic Publishers, Printed in the Netherlands.

Robert J. Hijmans, Susan E. Cameron, Juan L. Parra, Peter G. Jones, Andy Jarvis, Very High resolution interpolated climate surfaces for global land areas, International Journal of climatology, vol. 25, Issue 15, Dec. 2005, pp. 1965-1978, Online library, Wiley.com.

* cited by examiner

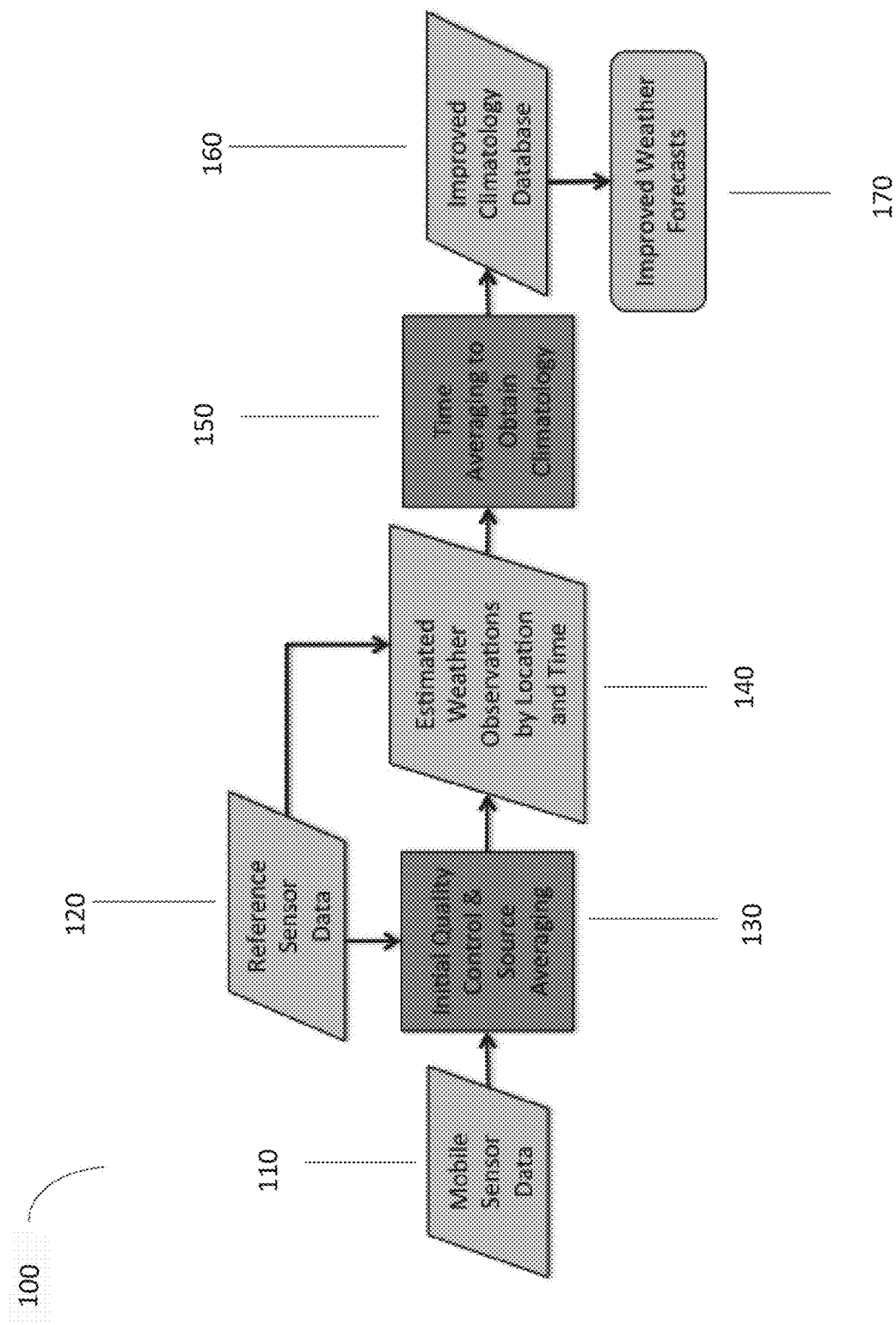

METHOD AND APPARATUS FOR FORECASTING WEATHER

TECHNICAL FIELD

The embodiments described below relate to a new method for improving weather forecasting using mobile sensors.

BACKGROUND OF THE INVENTION

Weather forecasts are often provided with relatively course geospatial and temporal resolution. For example, users are often provided weather forecasts for the nearest major metropolitan area to their location of interest. Although the rate at which the forecasts are updated may vary, often, the forecasts are only updated hourly. Many forecasts that are delivered to end users are provided by the National Weather Service or other private vendors. While updating the forecast more often and/or reducing the geospatial distance between forecasted locations would be ideal, much of the information would go unused and thus, would result in an excessive amount of computation that is wasted. Consequently, weather forecasts are currently generated in "bulk", meaning a system generates forecasts for many cities, for example 10,000 globally and does so hourly. Although some systems may update more often or include improved geospatial resolution, the forecasts generally do not update instantly or correspond to a user's special location. Providing such resolution would be impractical in most situations. Imagine the computer power required to generate forecasts every minute at one meter spacing globally.

There exist certain situations where more detailed and refined weather information (current conditions or forecasts) is desired. The need for more detailed and updated weather information has become more prevalent with the increased use of mobile devices capable of receiving weather information over wireless internet connections or cellular connections. With the increased ability to receive instantaneous information, users continually desire weather information that is up to date and relevant to their special location.

The prior art systems that are currently available simply provide a user with existing data from an existing forecast, such as one provided by the National Weather Service or one created by the prior art system without any input by the user and forward the existing data to users without providing additional computations to update the forecast. Therefore, the weather information provided to the user is relatively generic and may not provide the specially desired by the user. In the climatological sciences, information is used for a variety of purposes. These include long-term forecasting for which climatology is often the best achievable estimate of weather conditions, downscaling of numerical weather forecast models, as a baseline for estimates of forecast skill, and the like. Climatological information is generally obtained by storing and analyzing observations from weather stations over a sufficiently long period of time. Traditionally, this has been done at fixed locations, since the purpose is to obtain a long-term statistically valid data set of average weather conditions. In some cases, estimates have been made of climatology at locations where sensors are not available, using a variety of techniques. Two examples are the PRISM data (http://www.prism.oregonstate.edu) and WorldClim (http://www.worldclim.org). These climatology grids have spatial resolution of 0.5--1 km or more.

What is needed is an improved climatology, with better spatial resolution, in order to improve the accuracy of weather forecasts. Spatial resolution may be dramatically improved by increasing the geographic dispersal of sensors, which may be achieved through the use of mobile sensors.

The embodiments described below overcome these and other problems and an advance in the art is achieved. The embodiments described below obtain a gridded forecast with a fixed geospatial resolution and preset refresh intervals. Upon receiving a user request for weather information for a particular location and timeframe, a new updated forecast is determined based on data from updated sensor inputs and interpolations between forecast locations provided by the gridded forecast.

SUMMARY OF THE INVENTION

The present application is designed to improve understanding of global weather phenomena and to improve gathering and analysis of real-time weather data. One means to accomplish the gathering of weather data employs mobile sensors, which may be located on mobile platforms such as, but not limited to, vehicles, mobile phones, and other movable platforms. Such platforms are deemed to be mobile when they do not remain at a permanent single fixed location.

A major challenge to estimating climatology at any given location is that the weather data for the given location must be obtained from multiple sensors. These sensors may have different biases or other calibration issues that prevent them from being used in a reliable manner as with fixed sensors. Obtaining climatology from mobile sensors thus presents new challenges that are distinctly different from the standard means of performing traditional climatology computations. The present application describes a means for utilizing mobile observations and improving on traditional methods for generating climatological information.

ASPECTS OF THE INVENTION

In one aspect, a method comprises:
  creating a computer operable data base;
  collecting reference data from stationary data collection sensors;
  adding the reference data to the database;
  collecting mobile data from non-stationary mobile data sensors;
  adding the mobile data to the database;
  performing initial quality control and source averaging on the database;
  creating estimated pseudo-observations;
  adding the pseudo-observations to the database;
  removing data values that do not meet quality control and source averaging standards;
  averaging the data points to obtain climatology;
  updating the climatology database by adding sensor values; and
  generating improved weather forecasts.

Preferably, the stationary sensors are fixed to weather stations, business, home, airport, and road side locations.

Preferably, the mobile data sensors are affixed to at least one of a car, a truck, an aircraft, a boat, a mobile telephone, an animal, and a person.

Preferably, the quality control and source averaging standards further comprises calculating an average value and removing values that are either greater than the average value by a pre-defined variance or less than the average value by a pre-defined variance.

Preferably, the quality control and source averaging further comprises removing values that are not contained within a pre-defined range of values.

Preferably, the pseudo-observations are created using spatial resolution comprised of at least one of geographic location and altitude.

Preferably, the data comprises humidity, rain fall amount, snow fall amount, water level, current temperature, high temperature, low temperature, wind chill, barometric pressure, relative humidity, high humidity, dew point, wind speed, wind direction, peak wind gust, and weather type.

In another aspect of the invention, a method of using mobile sensors in weather forecasting comprises:

collecting reference data from stationary fixed sensors;

collecting data from mobile data sensors;

compiling the reference data and the mobile data into a database;

performing quality control and source averaging on the database;

estimating weather observations by geographic location and by time using the database;

averaging the data points from the database contained data; and generating weather forecasts from the database contained data.

Preferably, the stationary sensors are fixed to weather stations, restaurants, airport, and road side locations.

Preferably, the mobile data sensors are affixed to at least one of a car, a truck, an aircraft, a boat, a mobile telephone, an animal, and a person.

Preferably, the quality control and source averaging standards further comprises calculating an average value and removing values that are either greater than the average value by a pre-defined variance or less than the average value by a pre-defined variance.

Preferably, the quality control and source averaging further comprises removing values that are not contained within a pre-defined range of values.

Preferably, the pseudo-observations are created using spatial resolution comprised of at least one of geographic location and altitude.

Preferably, the data comprises humidity, rain fall amount, snow fall amount, water level, current temperature, high temperature, low temperature, wind chill, barometric pressure, relative humidity, high humidity, dew point, wind speed, wind direction, peak wind gust, and weather type.

In another aspect of the invention an apparatus for weather forecasting, comprises:

a computer operable database containing weather data;

weather sensors attached to mobile platforms;

connectivity to transport weather sensor data into the database;

computer operable means to evaluate the data in the database and perform quality control and source averaging, computer quality control and source averaging standards, and to derive pseudo-observations.

Preferably, the mobile data sensors are affixed to at least one of a car, a truck, an aircraft, a boat, a mobile telephone, an animal, and a person.

Preferably, the quality control and source averaging standards further comprises calculating an average value and removing values that are either greater than the average value by a pre-defined variance or less than the average value by a pre-defined variance.

Preferably, the quality control and source averaging further comprises removing values that are not contained within a pre-defined range of values.

Preferably, the pseudo-observations are created using spatial resolution comprised of at least one of geographic location and altitude.

Preferably, the data comprises humidity, rain fall amount, snow fall amount, water level, current temperature, high temperature, low temperature, wind chill, barometric pressure, relative humidity, high humidity, dew point, wind speed, wind direction, peak wind gust, and weather type.

BRIEF DESCRIPTION OF THE DRAWINGS

FIG. 1 is a flowchart illustrating the method steps of the present application.

DETAILED DESCRIPTION OF THE INVENTION

FIG. 1 and the following description depict specific examples to teach those skilled in the art how to make and use the best mode of the Application. For the purpose of teaching inventive principles, some conventional aspects have been simplified or omitted. Those skilled in the art will appreciate variations from these examples that fall within the scope of the Application. Those skilled in the art will appreciate that the features described below can be combined in various ways to form multiple variations of the Application. As a result, the Application is not limited to the specific examples described below, but only by the claims and their equivalents.

FIG. 1 presents a block diagram 100 overview of the technique incorporated by the present application. A first step of retrieving mobile sensor data 110 was presented in prior patent Application No. 61/697,649 filed Sep. 6, 2012.

A next step 120 generates and retrieves reference sensor data. Reference sensors are located at fixed and known locations where the sensors are not moved. Such reference sensors may include, but are not limited to, weather stations, business, homes, airports, road side locations, remote locations and the like. Such sensor data may be recorded by a mechanical or an electronic recording means attached to the sensor. The data may be collected by retrieval of the associated storage medium at the sensor location. The sensor data may also be sent from the sensor location to another central data gathering location by means of a broadcast signal, a cable or telephonic signal or by a computer data transmission means.

A next step 130 is to implement quality control and source averaging using the mobile sensor data 110 and the reference sensor data 120 retrieved from sensors. The mobile and reference data is incorporated to produce statistical estimates of missing or needed observations, which are referred to in the art as pseudo-observations.

Pseudo-observations are estimates of actual values which are employed when a single, accurate observation of a value is not available. A pseudo-observation for a specific location and time would be a value which is obtained by statistically analyzing and combining observed data values at nearby locations and times. An example of a pseudo-observation would be a needed but unknown temperature at a position between two locations where observations have been obtained, or at a time intermediate to two times at which observations have been obtained, or both. The estimated temperature unknown is typically close to the temperatures obtained by observation, recognizing that those observed temperatures include errors in their own estimation of the actual temperature. Often, the known temperatures could constitute a range and the pseudo-observation should lie somewhere within that range. Pseudo-observations for a specific location and time are calculated by aggregating a set of real measured observations from locations near the specific point recorded within an acceptably small time interval. Such a pseudo-observation is a value representing an estimate of a value that would be observed at the specific location and time if an accurate observation at that time and location had been possible.

Examples of pseudo-observations may include estimated temperatures derived from temperatures recorded by vehicles passing near a specific road mile marker during a suitable time interval. Temperature data may be gathered from vehicles that travel past a selected mile marker within a 15 minutes period. Averaging these temperature measurements from all vehicles may then provide an estimate of the temperature at the mile marker. This pseudo-observation may be relevant even though no single, accurate vehicle observation may be located exactly at the given mile marker during the 15 minute time period. A pseudo-observation is thus produced by combining multiple real observations even though none of the observations was actually made at the time or location of interest. A pseudo-observation may also be deemed an estimated weather observation and may be used as input for an input weather observation.

A next step 140 also incorporates reference sensor data with initial quality control and source averaging in order to estimate weather observations by location and time. Quality control is necessary because some mobile observations may sometimes produce inaccurate values and some vehicle temperature sensors may not accurately measure temperature when the vehicle is stationary. Quality control may comprise using reference data, mobile data and pseudo-observation data to determine an average data value or a range of acceptable data values and then eliminate values that differ dramatically from the average data value or eliminate data values that stray outside of the acceptable range of values. This may serve to remove data outliers originating from vehicles that are not moving or have other quality issues in order to improve the accuracy and consistency of the data set. Source averaging may also entail aggregating vehicle observations in order to obtain a single estimated value.

A next step 150 uses time averaging to obtain climatology. Climatology may be defined as the expected value and related statistical measures over some time period, such as a week or a month. Estimated weather observations such as but not limited to pseudo-observations, consist of values obtained from sensors located at multiple locations and during many different time spans such as over the course of many days or many months. Time averaging is a process of averaging data values over all days within a month or other suitable climatological period. Such an average may comprise as an example, the average temperature of all temperatures recorded at noon at a given location for the month of January. If the temperature was not recorded on a given day, a pseudo-observation may be used to replace the missing data points. The process of interpolation might be used to derive pseudo-observations. Interpolation may also be used to derive values that occur at times that are different from the times being recorded. Thus interpolation of values obtained at noon may produce valid pseudo-observations of values at 11:00 AM.

A next step 160, an improved climatological database is generated by treating the pseudo-observations as if they are traditional fixed sensor observations. Here reference sensor data 120 is incorporated with mobile sensor data in order to create an improved climatology database. The data may then be augmented with pseudo-observations based on the spatial resolution of the data. Spatial resolution may be increased by collecting data from sensors located at different physical geographical locations. These locations will differ from each other horizontally. Some pseudo-observations may also be derived based on locations that differ from each other vertically at different altitudes than the previously existing climatology data. Typically, pseudo-observations are improved when spatial resolution is considered with the data. Such a database contains more accurate pseudo-observations at locations where no fixed sensors presently exist. As such, the number of pseudo-observations may be greater than the number of observations recorded from actual fixed sensor observations.

In the last step 170, improved weather forecasts are generated from the data in the improved climatology database. The number of available climatology data points has been increased due to the number of data points collected from mobile sensors. The increased number of climatology data points also facilitates the development of derived pseudo-observations, which serve to increase the total number of useful mobile sensor data points. The increased number of mobile sensor data points means that some outlier data points may be dropped from the overall data set without affecting the overall number of data points. This results in more climatology data points and better data quality, which increases the accuracy of the weather forecasts produced by the system.

The detailed descriptions of the above embodiments are not exhaustive descriptions of all embodiments contemplated by the inventors to be within the scope of the Application. Indeed, persons skilled in the art will recognize that certain elements of the above-described embodiments may variously be combined or eliminated to create further embodiments, and such further embodiments fall within the scope and teachings of the Application. It will also be apparent to those of ordinary skill in the art that the above-described embodiments may be combined in whole or in part to create additional embodiments within the scope and teachings of the Application.

The invention claimed is:

1. A method comprising:
providing a vehicle, having a non-stationary mobile data sensor therewith;
creating a computer operable database;
collecting reference data from stationary data collection sensors;
adding the reference data to the database;
collecting mobile data from the non-stationary mobile data sensor when the vehicle passes proximate a predetermined geolocation within a predetermined time period;
adding the mobile data to the database;
performing initial quality control and source averaging on the database;
creating estimated pseudo-observations;
adding pseudo-observations to the database;
removing a data value that does not meet quality control and source averaging standards;
averaging or otherwise statistically reducing a plurality of data points to obtain climatology;
updating a climatology database by adding at least one sensor value; and
generating improved weather forecasts.

2. The method of claim 1, wherein the stationary sensors are fixed to weather stations, businesses, homes, airport, and road side locations.

3. The method of claim 1, wherein the vehicle is at least one of a car, a truck, an aircraft, a boat, a mobile telephone, an animal, and a person.

4. The method of claim 1, wherein the quality control and source averaging standards further comprises calculating an average value and removing values that are either greater than the average value by a pre-defined variance or less than the average value by a pre-defined variance.

5. The method of claim 1, wherein the quality control and source averaging further comprises removing values that are not contained within a pre-defined range of values.

6. The method of claim 1, wherein the pseudo-observations are created using spatial resolution comprised of at least one of geographic location and altitude.

7. The method of claim 1, wherein the data comprises humidity, precipitation amount, precipitation probability, water level, current temperature, high temperature, low temperature, wind chill, barometric pressure, relative humidity, high humidity, dew point, wind speed, wind direction, peak wind gust, and weather type.

8. The method of claim 1, wherein the data collected from the mobile data sensors is only collected when the vehicle is in motion.

9. A method of using mobile sensors in weather forecasting comprising:
   collecting reference data from stationary fixed sensors;
   providing a vehicle, having a non-stationary mobile data sensor therewith when the vehicle passes proximate a predetermined geolocation within a predetermined time period;
   collecting mobile data from the mobile data sensor;
   compiling the reference data and the mobile data into a database;
   performing quality control and source averaging on the database;
   estimating weather observations by geographic location and by time using the database;
   averaging or otherwise statistically reducing a plurality of data points from the database; and
   generating weather forecasts using the database.

10. The method of claim 9, wherein the stationary sensors are fixed to weather stations, businesses, homes, airport, and road side locations.

11. The method of claim 9, wherein the vehicle is at least one of a car, a truck, an aircraft, a boat, a mobile telephone, an animal, and a person.

12. The method of claim 9, wherein the quality control and source averaging standards further comprises calculating an average value and removing values that are either greater than the average value by a pre-defined variance or less than the average value by a pre-defined variance.

13. The method of claim 9, wherein the quality control and source averaging further comprises removing values that are not contained within a pre-defined range of values.

14. The method of claim 9, wherein the pseudo-observations are created using spatial resolution comprised of at least one of geographic location and altitude.

15. The method of claim 9, wherein the data comprises humidity, precipitation amount, precipitation probability, water level, current temperature, high temperature, low temperature, wind chill, barometric pressure, relative humidity, high humidity, dew point, wind speed, wind direction, peak wind gust, and weather type.

16. The method of claim 9, wherein the data collected from the mobile data sensors is only collected when the vehicle is in motion.

* * * * *